United States Patent
(10) Patent No.: US 8,675,340 B2
(45) Date of Patent: Mar. 18, 2014

Hwang et al.

(54) MULTILAYER CERAMIC ELECTRONIC COMPONENT AND METHOD OF MANUFACTURING THE SAME

(75) Inventors: Seok Joon Hwang, Gyunggi-do (KR); Je Jung Kim, Gyunggi-do (KR); Jae Yeol Choi, Gyunggi-do (KR); Sang Hoon Kwon, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/534,812

(22) Filed: Jun. 27, 2012

(65) Prior Publication Data

US 2013/0141835 A1 Jun. 6, 2013

(30) Foreign Application Priority Data

Dec. 6, 2011 (KR) ........................ 10-2011-0129650

(51) Int. Cl.
 *H01G 4/008* (2006.01)
(52) U.S. Cl.
 USPC .......................................... 361/305; 29/25.42
(58) Field of Classification Search
 USPC .................. 361/303, 305; 29/25.42
 See application file for complete search history.

(56) References Cited

U.S. PATENT DOCUMENTS

| 3,342,655 | A * | 9/1967 | Crownover ................. 156/89.14 |
| 7,158,364 | B2 * | 1/2007 | Miyauchi et al. ............. 361/303 |
| 7,857,886 | B2 * | 12/2010 | Celik et al. ..................... 75/255 |
| 2011/0226403 | A1 * | 9/2011 | Sakaguchi et al. ........... 156/62.8 |

FOREIGN PATENT DOCUMENTS

| JP | 11-067588 | 3/1999 |
| KR | 10-2006-0125277 A | 12/2006 |

OTHER PUBLICATIONS

Chen et al., "Sintering Behavior and Interfacial Analysis of Ni/Cu Electrode with BaTiO3 Particulates", 2005, Journal of Electroceramics, 15, 25-36.*

* cited by examiner

*Primary Examiner* — Eric Thomas
(74) *Attorney, Agent, or Firm* — McDermott Will & Emery LLP

(57) ABSTRACT

There is provided a multilayer ceramic electronic component, including: a ceramic element having a plurality of dielectric layers laminated therein; and first and second internal electrodes formed within the ceramic element, wherein the first and second internal electrodes include 80 to 99.98 wt % of nickel (Ni), 0.01 to 10 wt % of copper (Cu), and 0.01 to 10 wt % of barium titanate ($BaTiO_3$).

10 Claims, 3 Drawing Sheets

A-A'

MULTILAYER CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2011-0129650 filed on Dec. 6, 2011, in the Korean Intellectual Property Office, the disclosure of which is incorporated herein by reference.

BACKGROUND OF THE INVENTION

1. Field of the Invention

The present invention relates to a multilayer ceramic electronic component and a method of manufacturing the same.

2. Description of the Related Art

Electronic parts using a ceramic material include a capacitor, an inductor, a piezoelectric element, a varistor, a thermistor, or the like.

Among these ceramic electronic parts, a multi-layer ceramic capacitor (MLCC) may have advantages such as a small size, high capacity, and easy mounting thereof.

A multilayer ceramic capacitor is a chip type condenser having a main function of being charged with or discharging electricity while being mounted on a circuit board used in a variety of electronic products, such as a computer, a personal digital assistant (PDA), a cellular phone, and the like. The multilayer ceramic capacitor may have various sizes and lamination types, depending on the intended usage and capacity thereof.

With the recent trend for the miniaturization of electronic products, ultra-miniaturized, ultra-high capacity multi-layer ceramic capacitors have been also been required.

For this reason, a multi-layer ceramic capacitor, in which dielectric layers and internal electrodes are thinly formed for the ultra-miniaturization of products and a large number of dielectric layers are laminated for the ultra-high capacitance thereof, has been manufactured.

Meanwhile, a decoupling capacitor may be used for reinforcing a filter by inserting resistors and condensers thereinto, in order to prevent signal connection through a power circuit.

In particular, in order to lower power consumption of a central processing unit (CPU) mounted in an electronic product, capacitance of the decoupling capacitor is required to be increased, while impedance |Z| is reduced through a decrease in equivalent series inductance (ESL).

Meanwhile, as equivalent series inductance (ESL) is generally lowered, equivalent series resistance (ESR) may also be decreased. Therefore, when decoupling capacitors having low equivalent series resistance (ESR) are connected in parallel, deviation from the target impedance |Z| at a specific frequency, the so-called "Big-V" phenomenon, may occur, resulting in voltage noise.

Therefore, although equivalent series inductance (ESL) needs to be lowered in the case of decoupling capacitors, there may be a limit to lowering equivalent series resistance (ESR), because it is necessary to reduce the Big-V phenomenon due to low equivalent series resistance (ESR).

SUMMARY OF THE INVENTION

An aspect of the present invention provides a multilayer ceramic electronic component capable of reducing a Big-V phenomenon by increasing equivalent series resistance (ESR) without an increase in equivalent series inductance (ESL).

According to an aspect of the present invention, there is provided a multilayer ceramic electronic component, including: a ceramic element having a plurality of dielectric layers laminated therein; and first and second internal electrodes formed within the ceramic element, wherein the first and second internal electrodes include 80 to 99.98 wt % of nickel (Ni), 0.01 to 10 wt % of copper (Cu), and 0.01 to 10 wt % of barium titanate (BaTiO3).

The multilayer ceramic electronic component may further include first and second external electrodes formed on both end surfaces of the ceramic element and electrically connected to the first and second internal electrodes.

The first and second internal electrodes may be alternately exposed through respective end surfaces of the ceramic element in a thickness direction.

The multilayer ceramic electronic component may further include dielectric cover layers formed on top and bottom surfaces of the ceramic element.

The multilayer ceramic electronic component may be a decoupling capacitor.

According to another aspect of the present invention, there is provided a method of manufacturing a multilayer ceramic electronic component, the method including: forming first and second internal electrode layers by printing a conductive paste including 80 to 99.98 wt % of nickel (Ni), 0.01 to 10 wt % of copper (Cu), and 0.01 to 10 wt % of barium titanate (BaTiO3) on at least one surface of each of a plurality of first and second ceramic sheets; alternately laminating the plurality of the first and second ceramic sheets having the first and second internal electrode layers formed thereon to form a laminate; firing the laminate; and forming first and second external electrodes to cover surfaces of the laminate, through which the first and second internal electrode layers are exposed.

In the forming of the first and second internal electrode layers, the conductive paste may further include ceramic powder or silica ($SiO_2$) powder.

In the forming of the first and second internal electrode layers, the conductive paste may have an average particle size of 50 to 400 nm.

In the forming of the first and second internal electrode layers, the first and second internal electrode layers may be alternately exposed through both end surfaces of the laminate in a thickness direction.

The method may further include forming dielectric cover layers on top and bottom surfaces of the laminate.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENT

Figure 1:
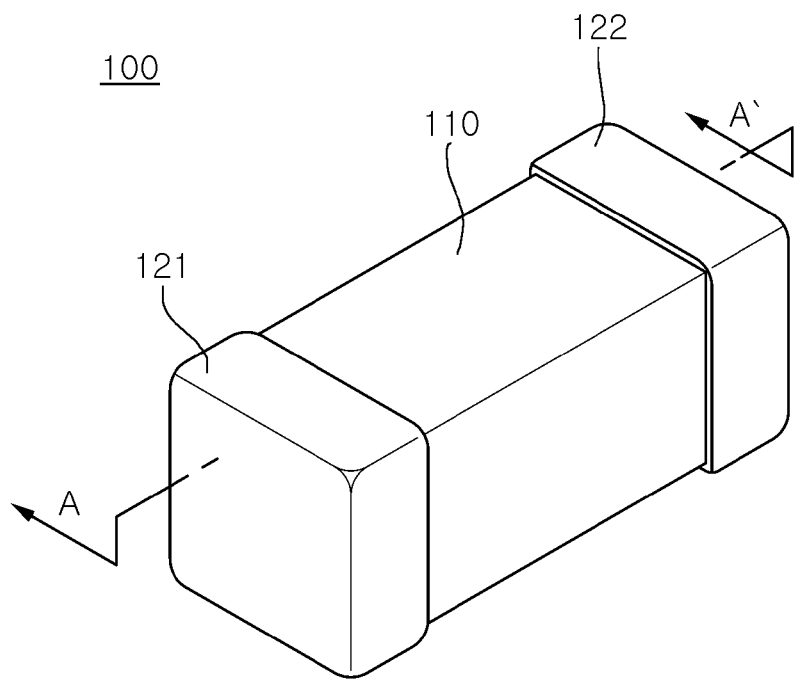
FIG. 1 is a schematic perspective view showing a structure of a multilayer ceramic capacitor according to an embodiment of the present invention.

Hereinafter, embodiments of the present invention will be described in detail with reference to the accompanying drawings so that they can be easily practiced by those skilled in the art to which the present invention pertains.

However, the invention may be embodied in many different forms and should not be construed as being limited to the embodiments set forth herein.

The embodiments of the present invention are provided so that those skilled in the art may more completely understand the present invention.

In the drawings, the shapes and dimensions may be exaggerated for clarity, and the same reference numerals will be used throughout to designate the same or like components.

In addition, like reference numerals denote parts performing similar functions and actions throughout the drawings.

In addition, unless explicitly described otherwise, "comprising" any components will be understood to imply the inclusion of other components but not the exclusion of any other components.

The present invention is directed to a ceramic electronic component, and the ceramic electronic component according to an embodiment of the present invention is a multilayer ceramic capacitor, an inductor, a piezoelectric element, a varistor, a chip resistor, a thermistor, or the like. The multilayer ceramic capacitor will be described as one example of the ceramic electronic component as follows.

Figure 2:
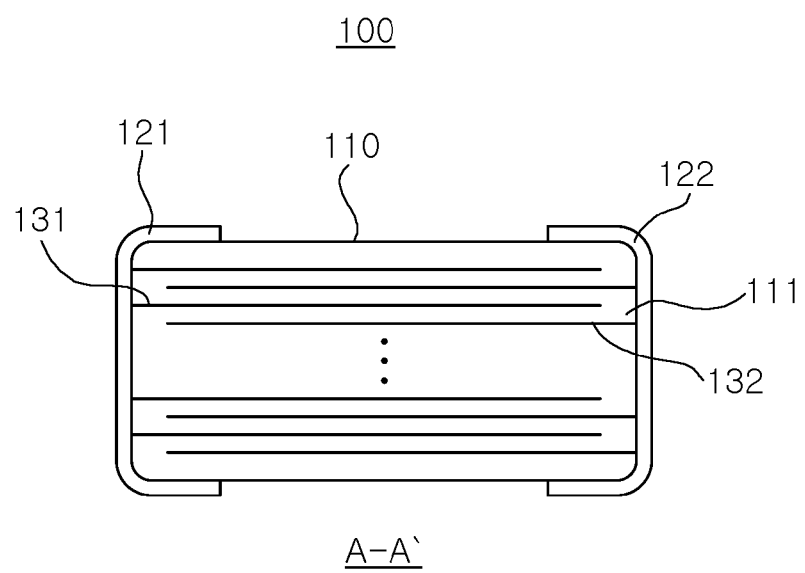
FIG. 2 is a cross-sectional view taken along line A-A' of FIG. 1.

Referring to FIGS. 1 and 2, a multilayer ceramic capacitor 100 according to the embodiment may include a ceramic elements 110 having a plurality of dielectric layers 111 laminated therein; and a plurality of first and second internal electrodes 131 and 132 each formed on at least one surface of each of the dielectric layers 111 within the ceramic element 110.

The first and second internal electrodes 131 and 132 may be formed of a conductive paste including conductive metals, and the conductive metals may include 80 to 99.98 wt % of nickel (Ni), 0.01 to 10 wt % of copper (Cu), and 0.01 to 10 wt % of barium titanate ($BaTiO_3$).

In addition, first and second external electrodes 121 and 122 may be formed on both end surfaces of the ceramic element 110 so as to be electrically connected to exposed portions of the first and second internal electrodes 131 and 132.

Here, the first and second external electrodes 121 and 122 may be electrically connected to the respective first and second internal electrodes 131 and 132 to thereby function as external terminals.

The ceramic elements 110 may be formed by laminating the plurality of dielectric layers 111.

Here, the plurality of dielectric layers 111 constituting the ceramic elements 110 may be sintered and integrated such that a boundary between adjacent dielectric layers 111 may not be readily apparent.

Also, the ceramic elements 110 is not particularly limited in view of a shape thereof, but may generally have a rectangular parallelepiped shape.

In addition, the size of the ceramic elements 110 is not particularly limited, but for example, the ceramic elements 110 may be formed to have a size of 0.6 mm×0.3 mm or the like, and thus, this ceramic elements 110 may constitute a multilayer ceramic capacitor having high capacitance of 1.0 µF or higher.

In addition, as necessary, a dielectric cover layer (not shown) having a predetermined thickness may be formed on the outermost surface of the ceramic element 110, that is, on top and bottom surfaces of the ceramic element 110, in the drawings.

The dielectric cover layer (not shown) is a dielectric layer on which the internal electrode is not formed. As necessary, two or more dielectric cover layers may be laminated in a thickness direction of the ceramic elements 110 to control the thickness thereof.

The dielectric layer 111 constituting this ceramic elements 110 may include a ceramic powder, for example, a $BaTiO_3$ based ceramic powder.

The $BaTiO_3$-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like is partially employed in $BaTiO_3$, but is not particularly limited thereto.

In addition, as necessary, the dielectric layers 111 may further include at least one of transition metal oxides or carbides, rare earth elements, and magnesium (Mg) or aluminum (Al), together with the ceramic powder.

In addition, a thickness of each dielectric layer 111 may be arbitrarily changed depending on a capacity design of the multilayer ceramic capacitor 100.

The first and second internal electrodes 131 and 132 may be printed on ceramic green sheets forming the dielectric layer 111 by using a copper-nickel paste through a printing method such as screen printing, gravure printing, or the like.

Then, the ceramic green sheets on which the internal electrode layers are printed are alternately laminated and subjected to sintering, thereby forming the ceramic element 110. Therefore, capacitance of the multilayer ceramic capacitor 100 may be formed by an overlapping region in which the first and second internal electrodes 131 and 132 overlap with each other.

Here, the first and second internal electrodes 131 and 132 may have different polarities from each other, and they may be alternately exposed through both end surfaces of the ceramic elements 110 in the thickness direction of the ceramic element 110.

In addition, thicknesses of the first and second internal electrodes 131 and 132 may be determined depending on an intended use thereof or the like, and for example, may be determined within a range of 0.2 to 1.0 µm in consideration of the size of the ceramic element 110. However, the present invention is not limited thereto.

The multilayer ceramic capacitor 100 according to the embodiment of the present invention may be a decoupling capacitor, and operations of the multilayer ceramic capacitor 100 according to the embodiment thus constituted will be described.

In order to reduce impedance |Z| of the multilayer ceramic capacitor 100, an increase in capacitance may be required in a frequency lower than a self resonance frequency and a reduction in equivalent series inductance (ESL) may be required in a frequency higher than the self resonance frequency.

However, as equivalent series resistance (ESR) rises, equivalent series inductance (ESL) also increases. Therefore, when multilayer ceramic capacitors 100 having low equivalent series resistance (ESR) are connected in parallel, deviation from a target impedance |Z| at a specific frequency, a so-called Big-V phenomenon may occur, resulting in voltage noise.

In other words, the multilayer ceramic capacitor 100 has a limit to lowering equivalent series resistance (ESR), in order to reduce the Big-V phenomenon due to low equivalent series resistance (ESR).

In the embodiment, a 2012 type of multilayer ceramic capacitor 100 having a capacitance of 22 μF may be used.

A skin resistance (Rs) of an internal electrode, which influences equivalent series resistance (ESR) at a high frequency, is proportional to electric conductivity (σ), as shown in Formula 1 below, and thus, it is inversely proportional to resistivity (ρ) of an electric material.

$$Rs \propto \sqrt{f\mu/\sigma}$$ [Formula 1]

In the embodiment, nickel-copper-barium titanate internal electrodes were formed by using 80 to 99.98 wt % of nickel (Ni) as a main component and adding 0.01 to 10 wt % of copper (Cu) and 0.01 to 10 wt % of barium titanate ($BaTiO_3$) thereto.

Thereafter, a chip having the internal electrodes was fired at about 1050 to 1250° C., equivalent series resistance (ESR) and equivalent series inductance (ESL) thereof were measured, and the measurement results were compared with equivalent series resistance (ESR) and the equivalent series inductance (ESL) of a chip having internal electrodes formed of 100 wt % of nickel.

Therefore, in the case of the nickel-copper-barium titanate internal electrodes according to the embodiment of the present invention, the equivalent series resistance (ESR) thereof could be increased without an increase in the equivalent series inductance (ESL) thereof, and voltage noise could be reduced as compared with the internal electrodes formed of only nickel.

Inventive examples according to the embodiment of the present invention and Comparative examples therefor will be described in detail with reference to Table 1 below.

TABLE 1

| Sample | Classification | Resistivity (ρ) (×10⁻⁶ Ωcm) | ESR (mΩ) |
|---|---|---|---|
| 1 | Ni(Cu 0%) | 6.9 | 3.1 |
| 2 | NiCu(Cu 0.01%, $BaTiO_3$ 5%) | 7.8 | 3.5 |
| 3 | NiCu(Cu 1%, $BaTiO_3$ 5%) | 8.3 | 8.6 |
| 4 | NiCu(Cu 5%, $BaTiO_3$ 5%) | 13.1 | 10.2 |
| 5 | NiCu(Cu 10%, $BaTiO_3$ 5%) | 14.4 | 11.2 |
| 6 | NiCu(Cu 15%, $BaTiO_3$ 5%) | 17.3 | 13.5 |

<Resistivity (ρ) and Equivalent Series Resistance (ESR) of Chip According to Components of Internal Electrodes>

Sample 1, a comparative example with respect to the present invention, shows a chip in which the first and second internal electrodes 131 and 132 are formed of 100 wt % of nickel.

In the case of a chip having first and second internal electrodes 131 and 132 formed of 100 wt % of copper according to the related art, resistivity (ρ) thereof was approximately 1.73.

Referring to Table 1, Sample 1, the comparative example had resistivity (ρ) of 6.9. Therefore, it can be seen that the resistivity (ρ) of Sample 1 in which the internal electrodes were formed of 100 wt % of nickel (Ni) was remarkably higher, as compared to that of the related art in which the internal electrodes were formed of 100 wt % of copper (Cu).

However, in the nickel (Ni) used in Sample 1, equivalent series inductance (ESL) may be lowered in accordance with a reduction in equivalent series resistance (ESR), to thereby result in the Big-V phenomenon in impedance at a specific frequency. Therefore, the internal electrodes formed of 100 wt % of nickel may not be used for the capacitor.

Samples 2 to 5, various inventive examples according to the embodiment of the present invention, show chips in which the plurality of first and second internal electrodes 131 and 132 positioned within the ceramic elements 110 were formed of 94.99, 94, 91, and 85 wt % of nickel (Ni), respectively, and 0.01, 1, 5, and 10 wt % of copper (Cu), respectively, and 5 wt % of barium titanate ($BaTiO_3$) was added thereto.

Samples 6, a comparative example according to the embodiment of the present invention, shows a chip in which the plurality of respective first and second internal electrodes 131 and 132 positioned within the ceramic elements 110 were formed of 80 wt % of nickel (Ni) and 15 wt % of copper (Cu), and 5 wt % of barium titanate ($BaTiO_3$) was added thereto.

Here, resistivities (ρ) of Samples 2, 3, 4, and 5 were 7.8, 8.3, 13.1, and 13.1, respectively, which were relatively increased as compared to the case of Sample 1 as the comparative example. Therefore, it was confirmed that there no defect in relation with a decrease in resistivity (ρ) was caused in the inventive examples.

Figure 3:
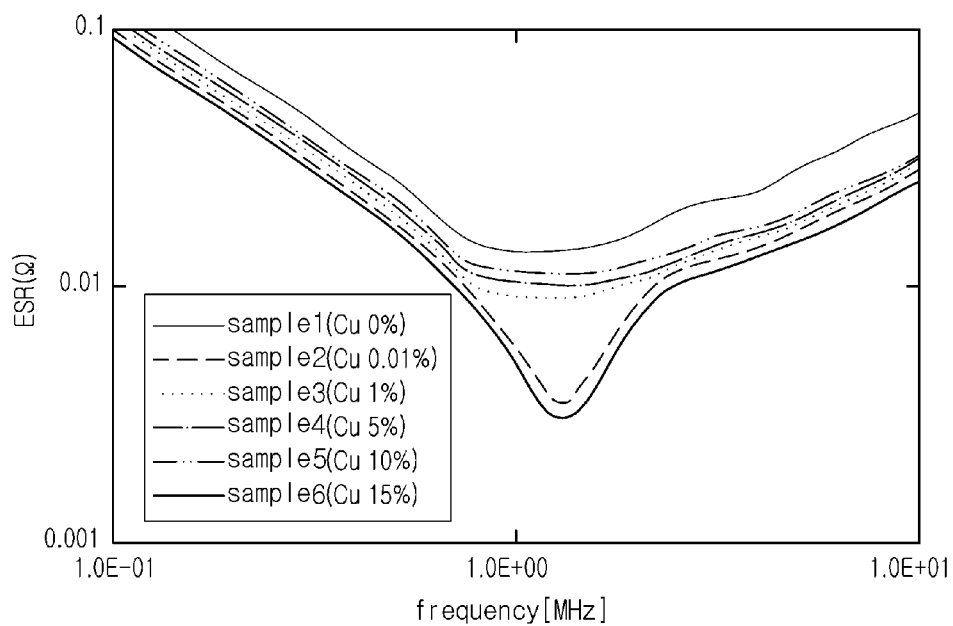
FIG. 3 is a graph comparing equivalent series inductance of (ESR) of the multilayer ceramic capacitor according to the embodiment of the present invention and equivalent series inductance (ESR) of a multilayer ceramic capacitor according to the related art.

FIG. 3 is a graph comparing equivalent series inductance (ESR) of the inventive examples and equivalent series inductance of the comparative example.

Referring to Table 1 and FIG. 3, it can be seen that, in the cases of the inventive examples, only equivalent series resistance (ESR) was increased without an increase in equivalent series inductance (ESL) in accordance with an increase in the content of nickel (Ni), at a frequency, particularly, a frequency of about 1.3 MHz.

In other words, copper (Cu) and barium titanate ($BaTiO_3$) were added in the internal electrodes, together with nickel (Ni), whereby some defects occurred when the internal electrodes were formed of 100 wt % of nickel (Ni) could be solved.

However, in the case of Sample 6, impedance was significantly increased at a frequency higher than the resonance frequency, and thus it can be seen that the suitable content range of nickel (Ni) was 10 wt % or lower.

Figure 4:
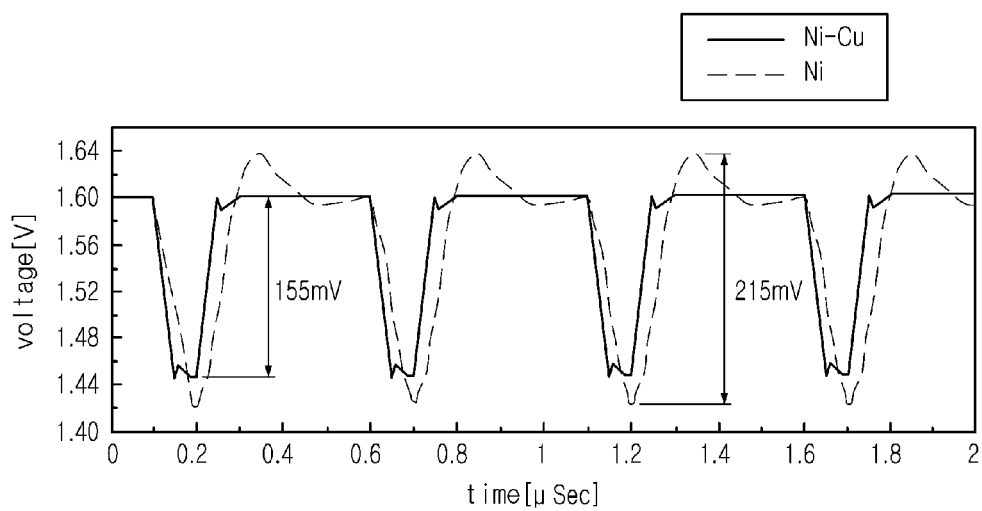
FIG. 4 is a graph comparing voltage of the multilayer ceramic capacitor according to the embodiment of the present invention and voltage of the multilayer ceramic capacitor according to the related art.

FIG. 4 is a graph comparing voltage noises of the inventive example and the comparative example. As the nickel-copper (NiCu) internal electrodes according to the inventive example of the present invention, Sample 4 of Table 1 was designated. As the comparative example, Sample 1 of Table 1 was designated. Then, voltage noises thereof were compared with each other. Referring to FIG. 4, Sample 1 as the comparative example exhibited voltage noise of 215 mV peak-to-peak (p-p) (amplitude magnitude ranging from the positive (+) maximum value to the negative (−) maximum value), while Sample 4 as the inventive example exhibited voltage noise of 155 mV p-p, a remarkably reduced value.

In addition, it can be confirmed that the Big-V phenomenon occurred at high and low points on the graph in the case of the comparative example, while the Big-V phenomenon was minimized owing to attenuation due to high resistivity (ρ) at high and low points on the graph in the case of the inventive example.

Figure 5:
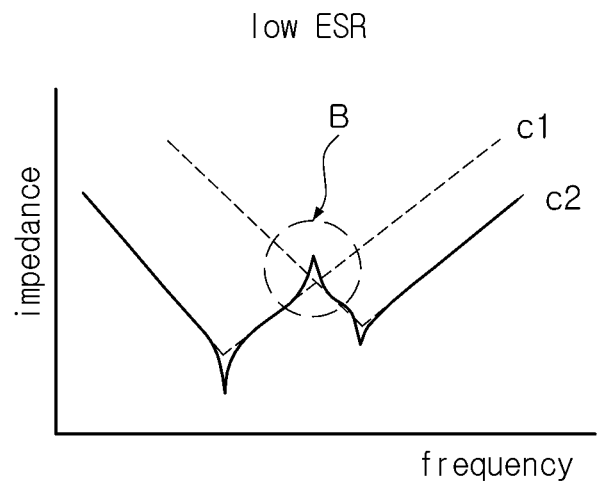
FIG. 5 is a graph showing impedance |Z| of the multilayer ceramic capacitor according to the related art at a low equivalent series resistance (ESR)
Figure 6:
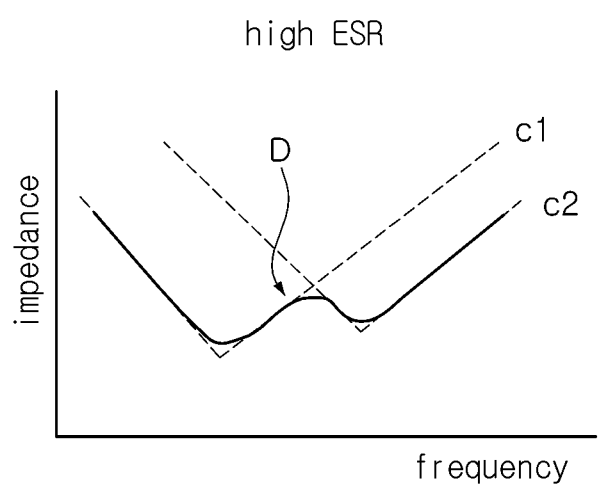
FIG. 6 is a graph showing the impedance |Z| of the multilayer ceramic capacitor according to the embodiment of the present invention at a high equivalent series resistance (ESR).

FIGS. 5 and 6 are graphs comparing impedance of the comparative example and impedance of the inventive example, with respect to a specific frequency.

Generally, when decoupling capacitors are connected in parallel, a ripple phenomenon in voltage may occur.

Here, the ripple phenomenon refers to a phenomenon in which voltage is instantly dropped due to shortage of current to cause malfunction of apparatuses.

To this end, two decoupling capacitors were connected in parallel, and then impedance was measured at low equivalent series resistance (ESR) for the comparative example in which the nickel internal electrodes were used while the impedance was measured at high equivalent series resistance (ESR) for the inventive example in which the nickel-copper-barium titanate internal electrodes were used.

Referring to FIG. 5, it can be seen that, in the case of the comparative example, the Big-V phenomenon occurred in portions in which high and low points of respective decoupling capacitors c1 and c2 meet, and in a portion (B) in which two decoupling capacitors c1 and c2 resonate in parallel.

On the other hand, referring to FIG. 6, it can be seen that, in the case of the inventive example, the Big-V phenomenon was minimized owing to attenuation due to resistivity, in portions in which high and low points of respective decoupling capacitors c1' and c2' meet, and in a portion (D) in which two decoupling capacitors c1' and c2' resonate.

Therefore, resistivity of the internal electrodes may be increased by adding a small amount of copper and barium titanate in the internal electrodes, together with nickel, and thus, equivalent series resistance may be increased without an increase in equivalent series inductance and the Big-V phenomenon may be effectively reduced.

Hereinafter, a method of manufacturing the multilayer ceramic capacitor 100 according to the embodiment of the present invention will be described.

A plurality of ceramic green sheets are prepared.

The ceramic green sheets are to form the dielectric layers 111 of the ceramic element 110, and may be formed by mixing ceramic powder, a polymer, and a solvent to prepare a slurry and then molding the slurry into sheets having a thickness of several μm through doctor blade method or the like.

Then, first and second internal electrode layers each are formed by printing a conductive paste on at least one surface of each of the ceramic green sheets in a predetermined thickness, for example, 0.2 to 1.0 μm.

The conductive paste may include 80 to 99.98 wt % of nickel (Ni), 0.01 to 10 wt % of copper (Cu), and 0.01 to 10 wt % of barium titanate ($BaTiO_3$).

Here, the first internal electrode layers formed on the first ceramic sheet are exposed through one end surface of the first ceramic sheet, and the second internal electrode layers formed on the second ceramic sheet are exposed through the other end surface of the second ceramic sheet.

As the printing method of the conductive paste, screen printing, gravure printing, or the like may be employed. The conductive paste may further include ceramic powder, silica ($SiO_2$) powder, or the like.

The conductive paste may have an average particle size of 50 to 400 nm, but the present invention is not limited thereto.

Then, after the plurality of ceramic green sheets having the first and second internal electrode layers are alternately laminated, and pressurized in a lamination direction, such that the plurality of ceramic green sheets laminated and the conductive paste formed on each of the ceramic green sheets are compressed to each other to form a laminate.

In addition, one or more dielectric cover layers (not shown) may be further laminated on top and bottom surfaces of the laminate.

The dielectric cover layers may have the same composition as that of the dielectric layers 111 positioned within the laminate. The dielectric cover layers are different from the dielectric layers 111 in that they do not include the internal electrodes thereon.

Thereafter, the laminate is cut into units of a region corresponding to one capacitor and individualized into each chip, and then the chips are fired at a high temperature, thereby completing the ceramic element 110.

Thereafter, first and second external electrodes 121 and 122 may be formed to cover the exposed portions of the first and second internal electrode layers, which are exposed through both end surfaces of the ceramic element 110, so that they are electrically connected to the respective first and second internal electrode layers.

Here, as necessary, surfaces of the first and second external electrodes 121 and 122 may be plate-treated with nickel, tin, or the like.

As set forth above, according to the embodiments of the present invention, resistivity ($\rho$) of the internal electrodes may be increased by adding copper (Cu) and barium titanate ($BaTiO_3$) in the internal electrodes, together with nickel (Ni), whereby equivalent series resistance (ESR) may be increased without an increase in equivalent series inductance (ESL) to reduce Big-V phenomenon.

While the present invention has been shown and described in connection with the embodiments, it will be apparent to those in the art that modifications and variations can be made without departing from the spirit and scope of the invention as defined by the appended claims.

What is claimed is:

1. A multilayer ceramic electronic component, comprising:
 a ceramic element having a plurality of dielectric layers laminated therein; and
 first and second internal electrodes formed within the ceramic element,
 wherein the first and second internal electrodes include 80 to 99.98 wt % of nickel (Ni), 0.01 to 10 wt % of copper (Cu), and 0.01 to 10 wt % of barium titanate ($BaTiO_3$).

2. The multilayer ceramic electronic component of claim 1, further comprising first and second external electrodes formed on both end surfaces of the ceramic element and electrically connected to the first and second internal electrodes.

3. The multilayer ceramic electronic component of claim 1, wherein the first and second internal electrodes are alternately exposed through both end surfaces of the ceramic element in a thickness direction.

4. The multilayer ceramic electronic component of claim 1, further comprising dielectric cover layers formed on top and bottom surfaces of the ceramic element.

5. The multilayer ceramic electronic component of claim 1, wherein the multilayer ceramic electronic component is a decoupling capacitor.

6. A method of manufacturing a multilayer ceramic electronic component, the method comprising:
 forming first and second internal electrode layers by printing a conductive paste including 80 to 99.98 wt % of nickel (Ni), 0.01 to 10 wt % of copper (Cu), and 0.01 to 10 wt % of barium titanate ($BaTiO_3$) on at least one surface of each of a plurality of first and second ceramic sheets;
 alternately laminating the plurality of the first and second ceramic sheets having the first and second internal electrode layers formed thereon to form a laminate;
 firing the laminate; and forming first and second external electrodes to cover surfaces of the laminate, through which the first and second internal electrode layers are exposed.

7. The method of claim 6, wherein in the forming of the first and second internal electrode layers, the conductive paste further includes ceramic powder or silica ($SiO_2$) powder.

8. The method of claim 6, wherein in the forming of the first and second internal electrode layers, the conductive paste has an average particle size of 50 to 400 nm.

9. The method of claim 6, wherein in the forming of the first and second internal electrode layers, the first and second internal electrode layers are alternately exposed through both end surfaces of the laminate in a thickness direction.

10. The method of claim 6, further comprising forming dielectric cover layers on top and bottom surfaces of the laminate.

* * * * *